July 19, 1932.    G. BAUER ET AL    1,868,130
CONTROL DEVICE FOR ENGINES AND ROTORS DRIVEN THEREBY
Filed June 18, 1930    2 Sheets-Sheet 1
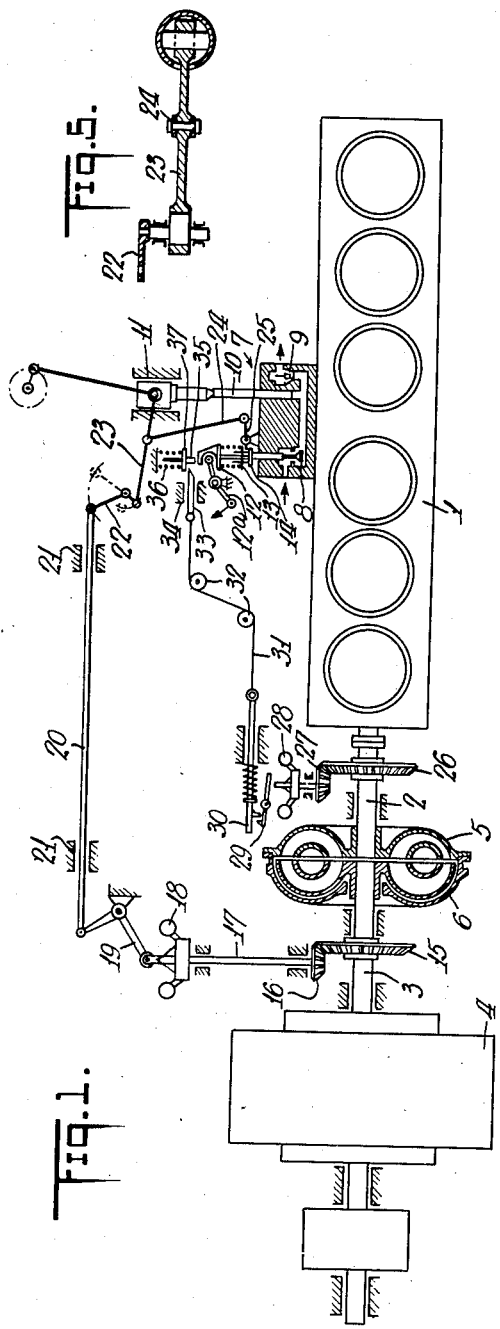
INVENTOR
*Gustav Bauer*
*Walter Brose*
BY
ATTORNEYS

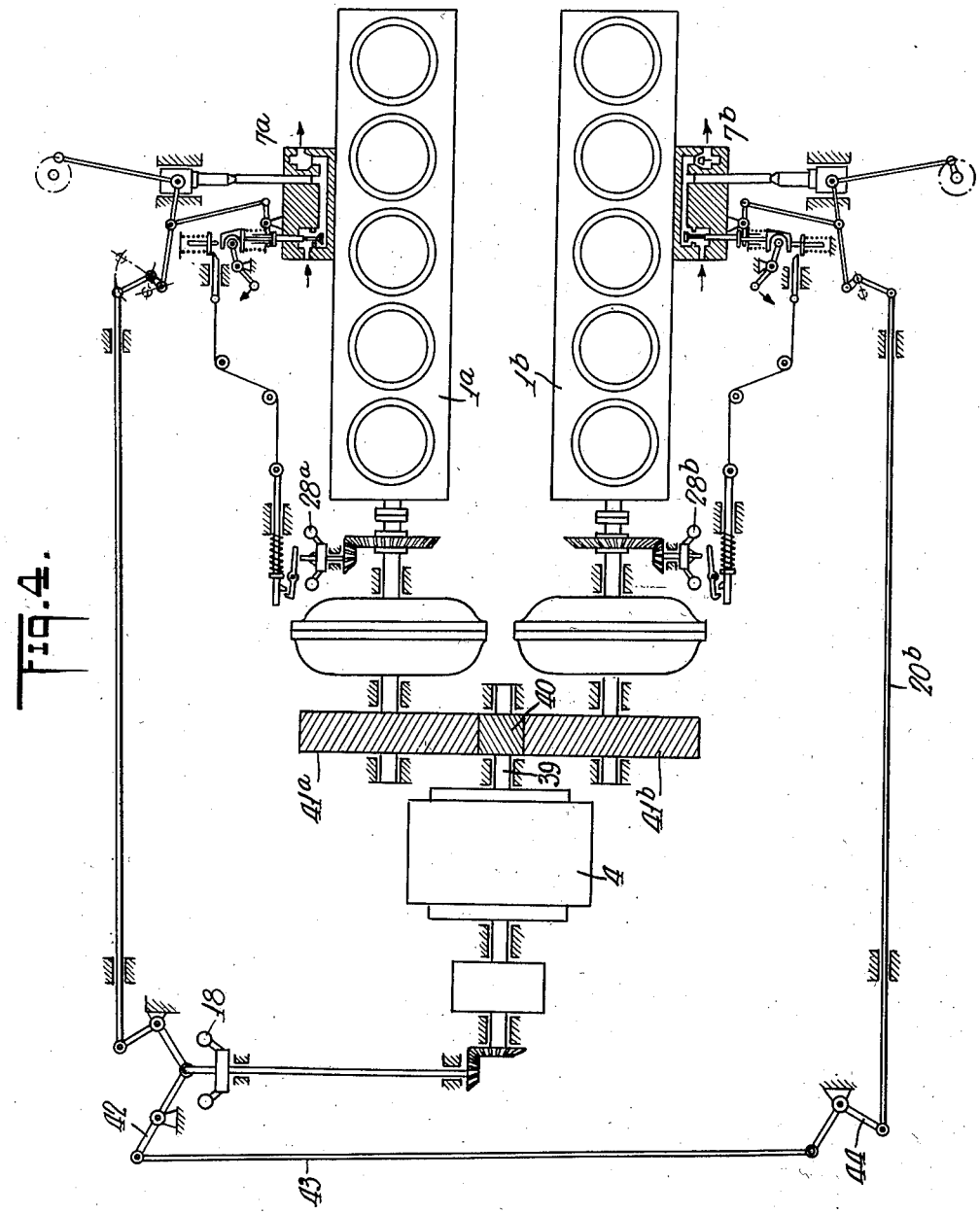

Patented July 19, 1932

1,868,130

UNITED STATES PATENT OFFICE

GUSTAV BAUER AND WALTER BROSE, OF HAMBURG, GERMANY

CONTROL DEVICE FOR ENGINES AND ROTORS DRIVEN THEREBY

Application filed June 18, 1930, Serial No. 461,931, and in Germany June 1, 1929.

This invention relates to power plants, and more particularly to a system for independently controlling the speed of driving and driven members, the shafts of which are so coupled as to permit slippage therebetween.

This invention is particularly adapted to a transmission system where the driving and driven members are connected by a coupling of the hydraulic type in which a pair of driving and driven rotors are each provided with an annular series of vanes, blades or passages, and the two rotors are so designed and so juxtaposed that the liquid in said passages causes a rotation of the driven rotor upon the rotation of the driving rotor. Such a construction is shown and broadly claimed in Föttinger Patent No. 1,199,359, September 26, 1916. The slippage, which is incidental to this type of coupling may become excessive or indefinite enough through leakage or other influences to destroy the effect of the speed of the driven member as a safe criterion of the speed of the driving member. Under these conditions, it is possible for the driving member to be raced beyond a critical speed, while the driven member is running at normal speed. The present invention accordingly provides means for controlling the speed of the driven member substantially constant, while the driving member is independently controlled to prevent its exceeding a predetermined speed limit. This control means on the driving member may be arranged to stop said driving member in case it exceeds this predetermined speed limit.

In accordance with the concrete exemplification of the present invention, the driving and driven members are connected by means of a slippage coupling. This may take the form of the hydraulic power transmitter of the Föttinger type hereinbefore discussed, or other types of couplings in which slippage may occur. Means are provided for regulating the energy input of the driving member in accordance with the speed of the driven member, so as to maintain the speed of said driven member substantially constant. Means are also provided, independently actuated in accordance with the speed of the driving member, for suspending the operation of said driving member in case it exceeds a predetermined speed limit.

The invention also involves certain new and important features of construction and combinations of parts hereinafter set forth and claimed.

Although the novel features which are believed to be characteristic of this invention will be particularly pointed out in the appended claims, the invention itself, as to its objects and advantages, the mode of its operation, and the manner of its organization may be better understood by referring to the following description taken in connection with the accompanying drawings forming a part thereof, in which Fig. 1 shows a plan view, partly in section, of a power transmission system embodying the present invention.

Figs. 2, 3 and 4 are plan views, partly in section, of modified forms embodying the present invention, and Fig. 5 shows detail of part of the linkage system associated with the suction valve of the prime mover.

Like reference characters denote like parts in the several figures of the drawings.

In the following description and in the claims parts will be identified by specific names for convenience, but they are intended to be as generic in their application to similar parts as the art will permit.

In accordance with the concrete exemplification of the present invention shown in Fig. 1, there is provided a driving member or prime mover which may take the form of a multi-cylinder Diesel engine 1 having a primary or driving shaft 2. This shaft 2 is connected to a secondary or driven shaft 3 of an electric generator 4 or other rotor or driven member through the interposition of a suitable coupling capable of slipping which preferably takes the form of a hydraulic power transmitter of the Föttinger type hereinbefore referred to. This coupling includes a driving member 5 in the form of a centrifugal pump impeller connected to the primary shaft 2 and adapted to drive a driven member 6 in the form of a turbine connected to the secondary shaft 3.

Fuel is cyclically injected into the Diesel engine 1 by means of a suitable fuel pump 7 having a suction valve 8, a discharge valve 9, and a pump piston 10. This pump piston 10 is reciprocated between guides 11 and driven through suitable mechanism operatively connected to the engine and not shown. The stem of the suction valve 8 has a plate 12 fixed at one end thereof and a loosely mounted collar 13 intermediate its ends. Disposed between said plate 12, and collar 13 is a coil spring. Also affixed to the stem of the suction valve 8 is a collar 14. The means for manually stopping the engine is shown somewhat diagrammatically as a rocker arm 12a engaging the plate 12. This may be operated to hold the valve partially open to reduce the charge and slow down or stop the engine.

In order to control this suction valve 8 so as to maintain the speed of the generator or other driven device 4 substantially constant, the secondary shaft 3 has mounted thereon a bevel gear 15 meshing with a bevel gear 16 carried on a shaft 17. The end of this shaft 17 has mounted thereon a governor 18, preferably of the precision speed type. This governor 18 operates one arm of the bell crank 19, the other arm of which is pivotally connected to a link 20 mounted for reciprocating movement between suitable guides 21. The other end of the link 20 is connected to a bell crank lever 22, having an eccentric connection with link 23, which cooperates with link 24 and lever 25. The free end of the lever 25 cooperates with the stem of the suction valve 8 between the collars 13 and 14. By means of this arrangement, the position of the suction valve 8 is controlled in accordance with the speed of the secondary or driven shaft 3.

The link 23 is connected to the cross head of the pump so that the connection of the link 23 to the bell crank lever 22 serves as a fulcrum for the link 23. As the cross head descends to make a pump piston stroke, the links 23 and 24 go down and the valve 8 is closed. As the cross head rises on the suction stroke the valve is forced down to open position. As the speed of the generator or other driven rotor 4 increases the bell crank lever 22 is moved from its normal position shown in solid line to or toward the dotted lines and the fulcrum of the link 23 is raised. Thus the inlet valve of the pump will stay open during the first part of the down stroke of the fuel pump and a smaller charge will be delivered into the engine and the speed of the engine will be reduced.

It should be observed that the operation of this governor is not itself dependent on the speed of the prime mover itself. It merely lowers or increases the speed of the prime mover as is necessary to maintain substantially constant the speed of the secondary shaft which is beyond the hydraulic coupling.

The slippage between the shafts 2 and 3 may be so great, due to leakage of fluid from the coupling, or other reasons, that in order to keep the driven rotor 4 up to the desired constant speed, the aforementioned governor will cause the prime mover to exceed its critical speed. This would indicate an abnormal and even dangerous condition. In order to prevent this condition, additional control means are provided independent of that associated with the rotor 4 for shutting down or suspending the operation of the prime mover in case it should exceed a predetermined speed limit.

For this purpose, the primary shaft 2 has mounted thereon a bevel gear 26 which meshes with a bevel gear 27 secured to a governor 28, said governor being preferably of the safety type. Mounted adjacent said governor 28, and in cooperative relationship therewith, is a latch lever 29 which cooperates with a spring-pressed latch 30. One end of the latter is connected to one end of a flexible traction member 31, which passes around suitable rollers 32, to a latch 33 positioned in suitable guides 34. This latch 33 normally restrains a pressure bolt 35 against the action of a spring 36. The end of this bolt 35 is normally spaced from and out of the path of movement of a head or bracket 37 connected to the plate 12 on the stem of the suction valve 8.

In the operation of this control, when the prime mover exceeds a predetermined speed limit, the governor 28 will react to tilt the latch lever 29 and release the latch member 30 so that its spring will move it to the left. This will cause latch 33 to move to the left, releasing thereby the pressure bolt 35, and permitting it to press against the valve head of the suction valve 8. This will open the suction valve completely so that the fuel pump 7 can no longer function.

The system shown in Fig. 2 is very similar to that shown in Fig. 1, except that the driven rotor is not positioned in alignment with the primary shaft 2, but is connected on a shaft 39 to the shaft 3 by a pair of intermeshing speed reducing gears 40 and 41. Otherwise, the governors operate exactly the same as that shown in Fig. 1.

In Fig. 3 is shown an arrangement the same as in Fig. 2 except that the governor 18 is driven from the rotor shaft 39. This gives a more delicate control of the driven rotor than in the form shown in Fig. 2.

Fig. 4 shows a system similar to Fig. 3 except that two Diesel engines 1a and 1b are both connected to the rotor shaft 39 by gears 41a and 41b meshing with the gear 40. The governor 28a controls the fuel pump 7a of motor 1a described with reference to Fig. 1 and a second governor 28b controls the fuel pump 7b of the motor 1b in the same manner.

The governor 18 which is driven by the rotor 4 serves to control both motors. The connections to the pump 7a are the same as described in connection with Fig. 1 and the connections to the pump 7b include an additional lever 42, link 43 and bell crank lever 44 to the link 20b.

Although the invention is described in a form particularly adapted to the control of a Diesel engine, it is obvious that it can be applied to the control of any prime mover such as a gasoline engine, steam engine and the like without departing from the spirit of the invention. Of course, with such prime movers as have no fuel pump the governors would be connected to operate whatever member controlled the speed of the prime mover, as for instance the throttle.

In multi-cylinder Diesel engines having two or more fuel pumps for separate cylinders or groups of cylinders, separate controls may extend from the governors to each of the fuel pumps. The fuel pump or pumps may be controlled by premature opening or delayed closing of the inlet valve or in other ways.

Having thus described our invention, what we claim as new and desire to secure by Letters Patent is:

1. In combination, a prime mover, a driven rotor connected to said prime mover by a slippage coupling whereby speed variations between the two are possible, means including a governor operable in accordance with the speed of the driven rotor for controlling the speed of the prime mover to maintain the speed of a driven rotor substantially constant, and means including the governor driven by the prime mover and effective only when the speed of said prime mover exceeds a predetermined limit.

2. In combination, a compression gas engine, a driven rotor, a hydraulic coupling of the Föttinger type therebetween, a fuel pump adapted to force fuel into said engine, a main governor operated by said driven rotor for controlling the actuation of said fuel pump to maintain the speed of the rotor substantially constant, and a second governor operated by said engine for controlling the actuation of said fuel pump, and effective to limit the speed of the engine when the slippage in the coupling is excessive.

3. In combination, a Diesel engine, an electric generator driven thereby, a hydraulic coupling therebetween and permitting slippage, a fuel pump for said engine, and two governors, one connected to said engine and the other to said generator and both serving to control said pump.

4. In combination, a Diesel engine, an electric generator driven thereby, a hydraulic coupling therebetween and permitting slippage, a fuel pump for said engine, and two governors, one connected to said engine and the other to said generator and both serving to control said pump, the governor driven by said engine being ineffective when said engine is operated at a speed to drive said generator at or below a predetermined desired speed.

5. In combination, a prime mover, a driven rotor, a slipping coupler therebetween, a main speed governor driven by said rotor for controlling said prime mover, and a safety governor driven by said prime mover and normally ineffective, but operable to control said prime mover only when excessive slippage in the coupling permits the speed of the prime mover to exceed a predetermined limit.

6. In combination, a prime mover, a driven member, a slippage coupling therebetween, means driven by said driven member for controlling the speed of the prime mover to maintain the speed of the driven member substantially constant regardless of variations in the slip in the coupling, and means driven by said prime mover and having a control range above that of said first mentioned means for rendering said first mentioned means ineffective when the speed of the prime mover exceeds a predetermined limit.

7. In combination, a prime mover, a driven member, a hydraulic coupling of the Föttinger type therebetween including a driving rotor connected to said prime mover and a driven rotor connected to said driven member, a governor driven by said driven member for controlling the speed of the prime mover to maintain the speed of said driven member substantially constant regardless of variations in the slip between the rotors of said coupling, and a safety governor driven by said prime mover and having a control range above that of said first mentioned governor for limiting the speed of the prime mover when the slippage in said coupling exceeds a predetermined limit.

8. In combination, a Diesel engine, an electric generator, a fluid coupling between said engine and said generator, a primary governor driven by said generator for controlling the speed of the engine to maintain the speed of the generator substantially constant during variations in the slip in the coupling, and a secondary governor driven by said engine for limiting the speed of the engine when the speed of the latter exceeds a predetermined limit.

Signed at Hamburg, Germany, this 9th day of May, 1930.

DR. GUSTAV BAUER.
WALTER BROSE.